United States Patent [19]

Hedderly

[11] Patent Number: 5,588,332
[45] Date of Patent: Dec. 31, 1996

[54] COLLAPSIBLE STEERING COLUMN ASSEMBLY

[75] Inventor: Gregory T. Hedderly, Livonia, Mich.

[73] Assignee: Ford Motor Company, Dearborn, Mich.

[21] Appl. No.: 414,562

[22] Filed: Mar. 31, 1995

[51] Int. Cl.⁶ ..................................................... B62D 1/19
[52] U.S. Cl. .............................. 74/493; 74/492; 188/371; 188/376
[58] Field of Search ...................... 74/492,493; 280/775, 280/777; 188/371, 376

[56] References Cited

U.S. PATENT DOCUMENTS 3,538,785 11/1970 Grancon ...................................... 74/492
4,183,258 1/1980 Stephan ...................................... 74/492
4,951,522 8/1990 Chowdhury et al. ....................... 74/492
5,024,118 6/1991 Khalifa et al. .............................. 74/492
5,052,715 10/1991 Ervin et al. ............................... 280/775

*Primary Examiner*—Allan D. Herrmann
*Attorney, Agent, or Firm*—Gregory P. Brown; Roger L. May

[57] ABSTRACT

A collapsible steering column assembly is provided, and includes a receiver which slidably receives a telescope housing. The telescope housing includes an internally collapsible shaft. A lower universal joint is removably secured to the receiver for supporting a collapsible intermediate shaft. The intermediate shaft is collapsible in the direction of the engine compartment upon presentation of sufficient load upon the telescope housing to disconnect the lower universal joint from the receiver once the telescope housing itself has been internally collapsed. A lower bearing retainer supports the lower universal joint within the receiver. Shearable rivets secure the lower bearing retainer to the receiver. The rivets shear when sufficient load is present.

12 Claims, 8 Drawing Sheets

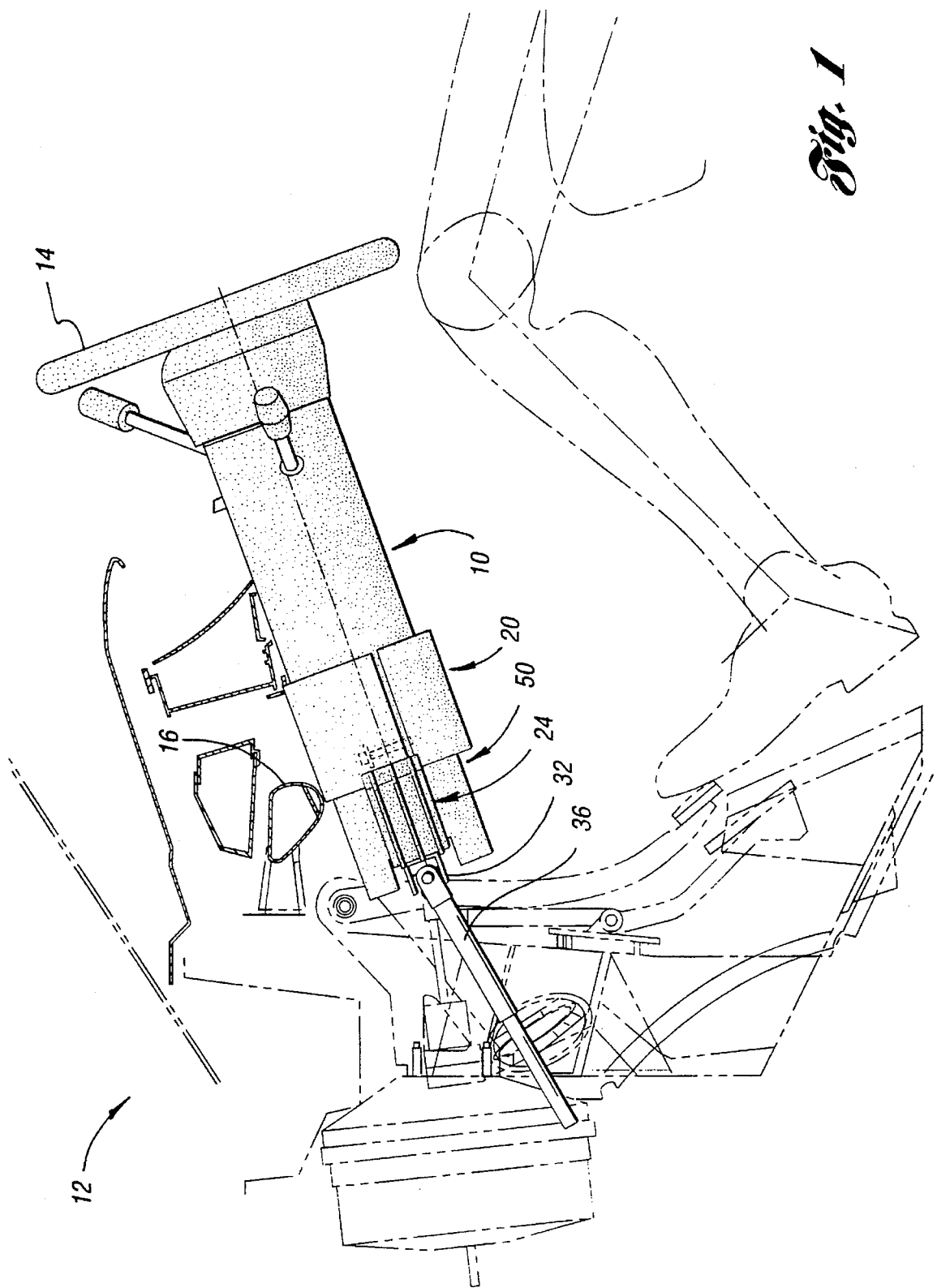

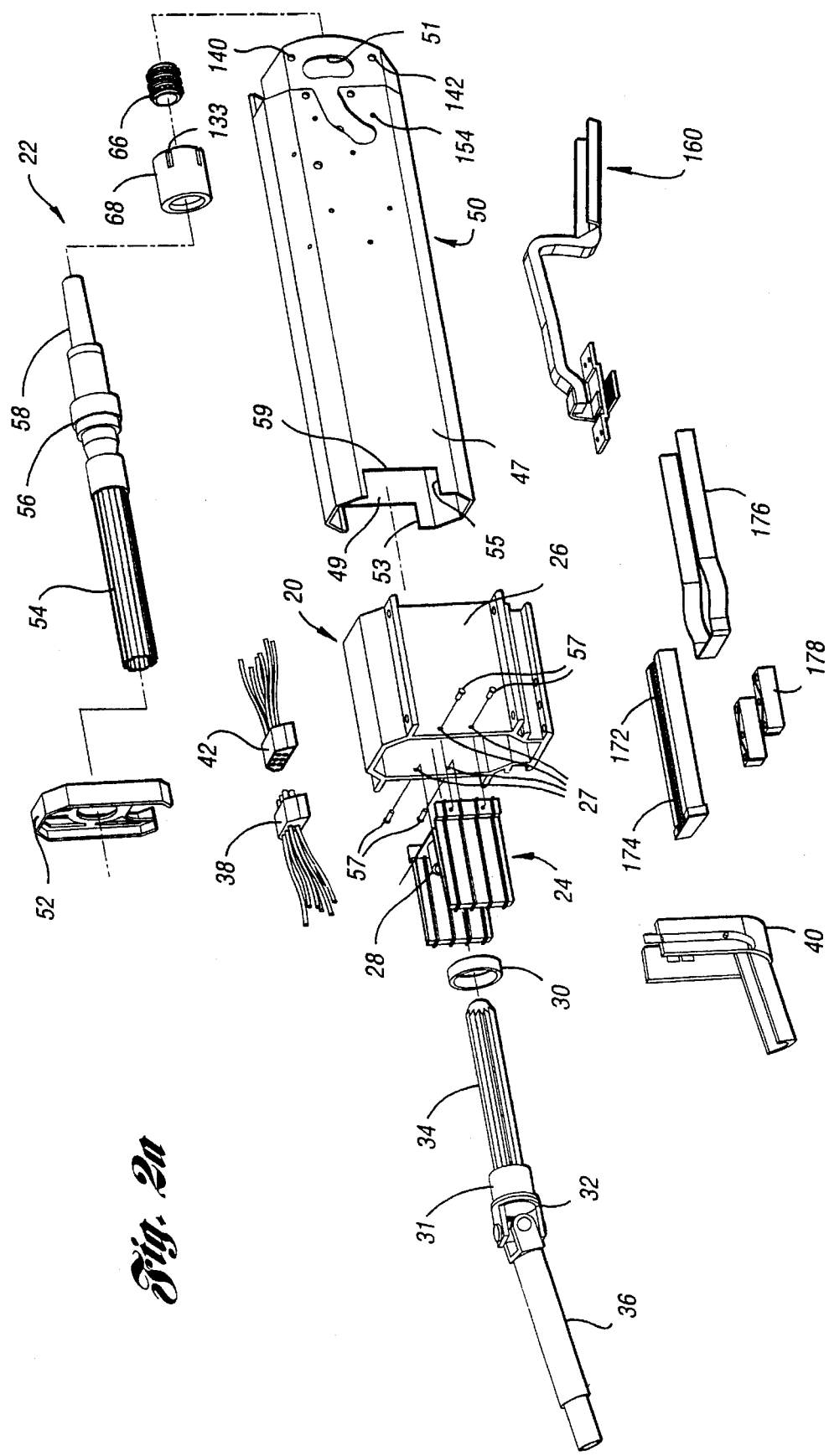

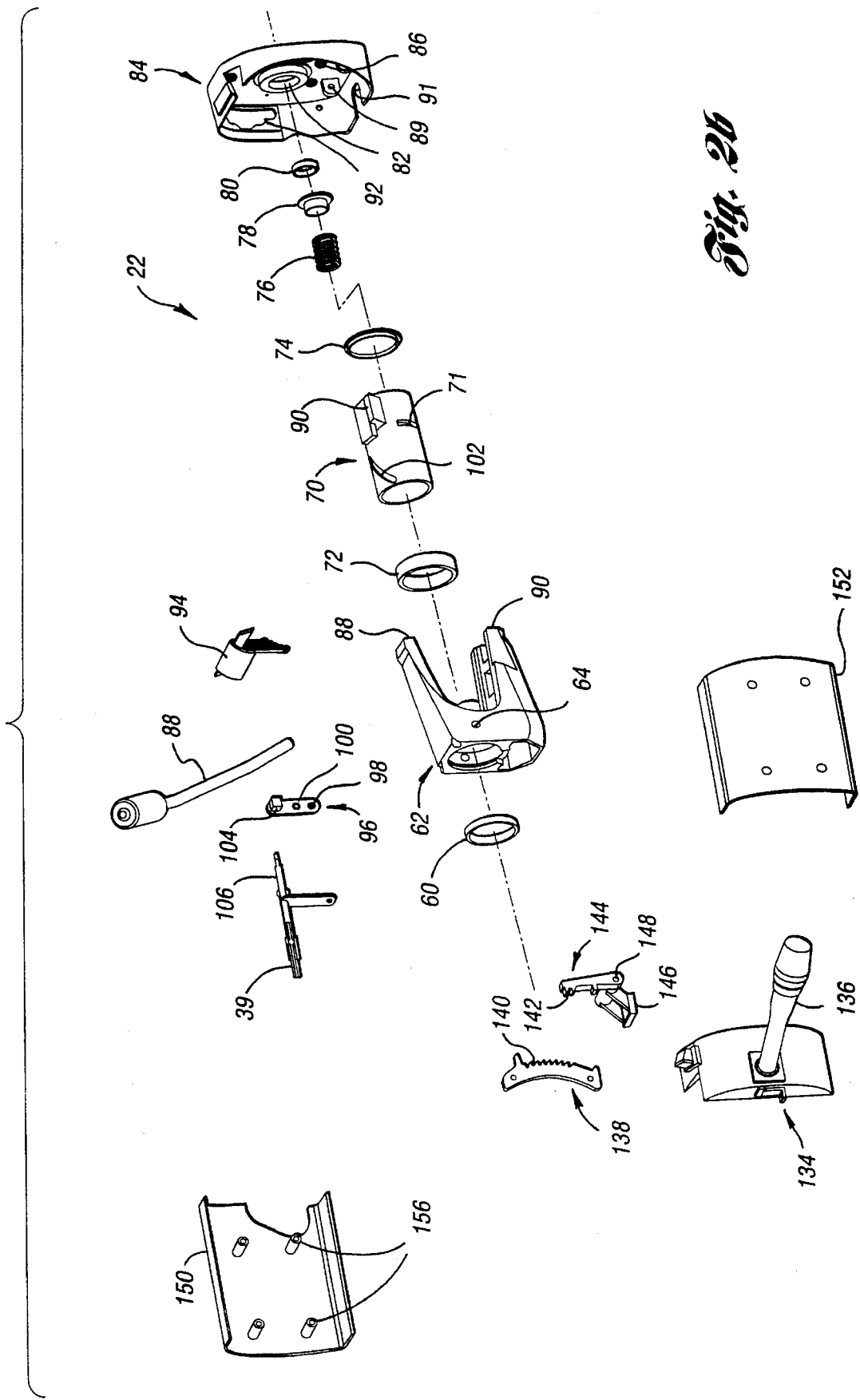

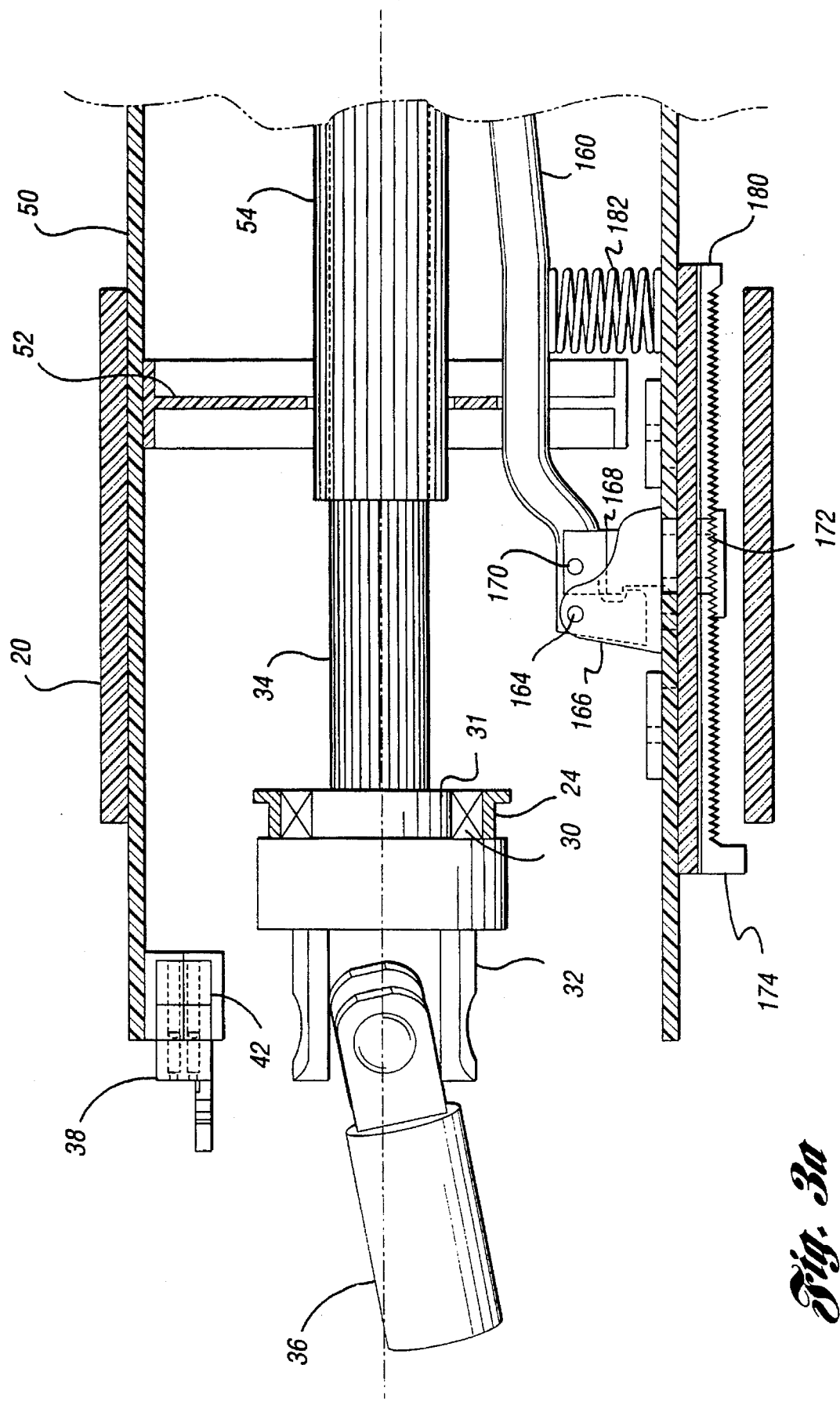

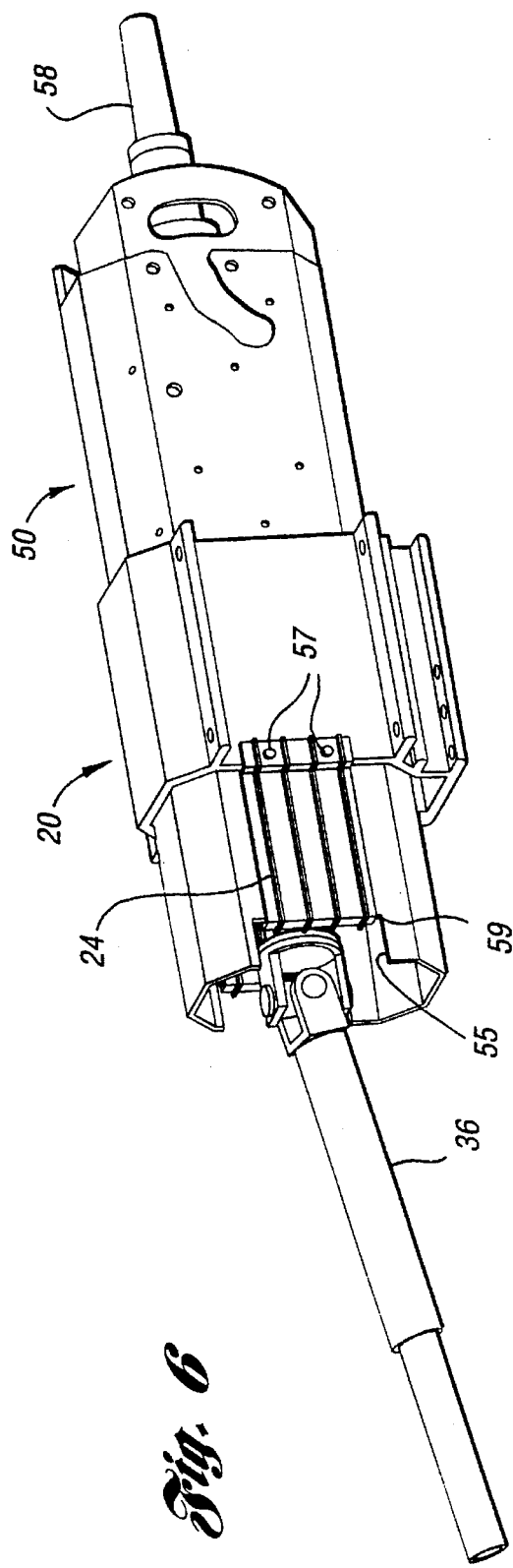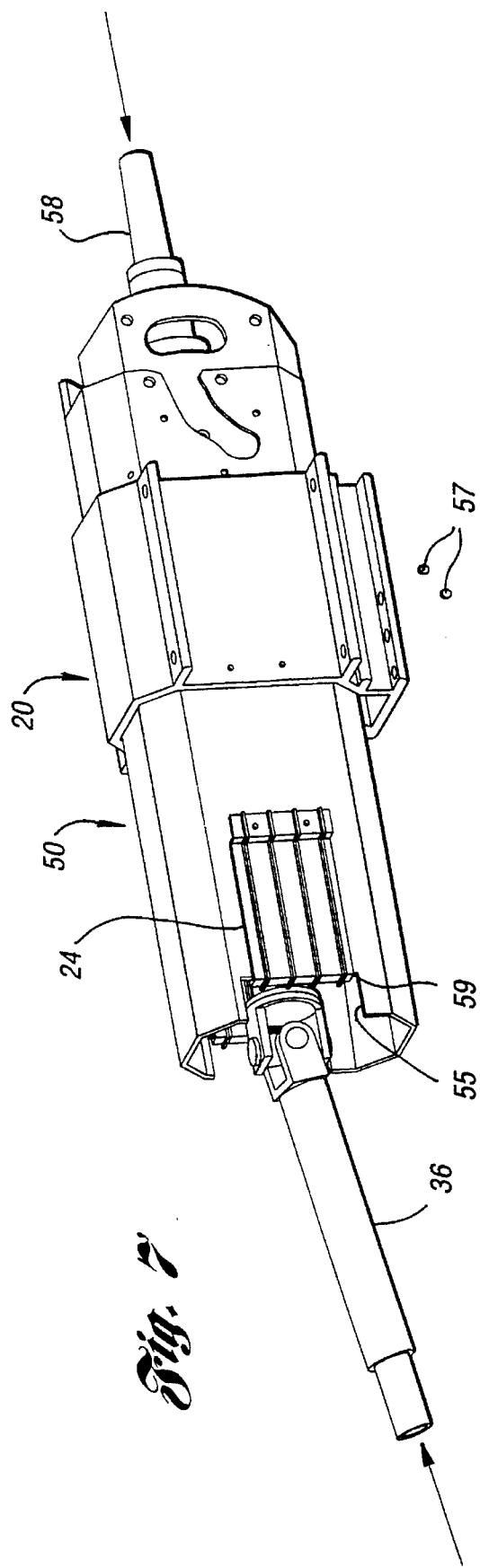

COLLAPSIBLE STEERING COLUMN ASSEMBLY

TECHNICAL FIELD

The present invention relates to steering column assemblies for vehicles, and more particularly to collapsible steering column assemblies.

BACKGROUND ART

Collapsible energy absorbing vehicular steering columns for application on vehicle steering systems have been well known and in popular use for a number of years. Some collapsible steering systems have frangible parts or have parts capable of relative movement under the action of impact forces. These systems generally comprise a significant number of parts and are relatively bulky.

One such collapsible steering shaft assembly is shown in U.S. Pat. No. 4,183,258 to Stephan. This patent discloses a collapsible shaft assembly comprising an outer sleeve forming a universal coupling with a coaxial inner sleeve disposed within the outer sleeve. A coaxial elastomeric sleeve is placed in radial compression within the inner and outer sleeves. A shaft is rotatably coupled to and axially slidable within the inner sleeve. A shearable lock is provided to hold the shaft axially relative to the inner sleeve up to a given, minimum axial load. When the lock shears in the presence of sufficient axial force, limited collapse is allowed.

U.S. Pat. No. 5,024,118 to Khalifa discloses a steering column guide structure for a collapsible steering column assembly. Triangular guide members adjacent to and above the upper portion of the steering column prevent upward movement of the upper portion of the steering column upon collapse of the column. A guide collar is provided around the lower portion of the steering column to axially guide the lower portion upon collapse. Energy is absorbed by deformation of the lower bracket 26. Frangible tabs are provided to allow the retainer 44 to move out of the way in order to allow energy absorption to occur at the lower support bracket during collapse. This design is structurally cumbersome because it is mounted to the vehicle at both the upper and lower support brackets, and it allows only limited column collapse.

It is desirable to provide a simple steering column assembly design which includes tilting and telescoping movement of the steering column shaft and includes a single releasable mounting point which allows further collapse of the intermediate steering column shaft into the engine compartment when the upper portion of the assembly has fully collapsed upon presentation of a sufficient axial load. Further, the overall design must be sufficiently universal to fit numerous vehicular applications.

SUMMARY OF THE INVENTION

The present invention addresses the foregoing concerns by providing an internally and externally collapsible steering column assembly. In other words, not only does the assembly collapse internally, but it also collapses externally in the direction of the engine compartment. This external collapse is achieved by providing a lower bearing retainer which disconnects from its support in a high-energy impact.

The present invention contemplates a collapsible steering column assembly for a vehicle, comprising a main housing rigidly supported in the vehicle and a lower bearing retainer connected to the main housing. A lower steering column assembly is rotatably supported with respect to the lower bearing retainer and includes a collapsible intermediate shaft. The intermediate shaft is collapsible when the lower bearing retainer is disconnected from the main housing. A telescope housing is telescopically moveable with respect to the main housing and is sufficiently engageable with the lower bearing retainer to disconnect the lower bearing retainer from the main housing when sufficient axial load is exerted on the telescope housing to allow collapse of the intermediate shaft.

The present invention further contemplates a collapsible steering column assembly comprising a receiver for supporting the steering column assembly in a vehicle. A telescope housing is slidably mounted with respect to the receiver. An upper steering column assembly includes an upper universal joint coupled with respect to the telescope housing. A lower bearing retainer is removably secured with respect to the receiver and includes a lower bearing supported therein. A lower steering column assembly includes a lower universal joint rotatably supported by the lower bearing, and the lower steering column assembly cooperates for telescoping movement with the upper steering column assembly. The telescope housing is engageable with the lower bearing retainer to disengage the lower bearing retainer from the receiver to allow collapse of the lower steering column assembly when sufficient axial load is exerted on the telescope housing.

An object of the present invention is to provide a steering column assembly which is sufficiently rigid to support linear ride down in a high-energy impact and includes a steering column shaft assembly both internally collapsible and externally collapsible in the direction of the engine compartment.

The above objects and other objects, features and advantages of the present invention are readily apparent from the following detailed description of the best mode for carrying out the invention when taken in connection with the accompanying drawings.

BRIEF DESCRIPTION OF THE DRAWINGS

FIG. 1 shows a side view of a steering column assembly in a vehicle in accordance with the present invention;

FIG. 2a shows an exploded perspective view of components of a steering column assembly in accordance with the present invention;

FIG. 2b shows an exploded perspective view of components of a steering column assembly in accordance with the present invention;

FIG. 3a shows a cutaway side view of the lower portion of a steering column assembly in accordance with the present invention;

FIG. 6 shows a perspective view of a telescope housing and receiver in accordance with the present invention, with the telescope housing engaging the lower bearing retainer; and FIG. 7 shows a perspective view of a telescope housing and receiver in accordance with the present invention, with the lower bearing retainer disengaged from the receiver.

DETAILED DESCRIPTION OF THE PREFERRED EMBODIMENT

Figure 3B:
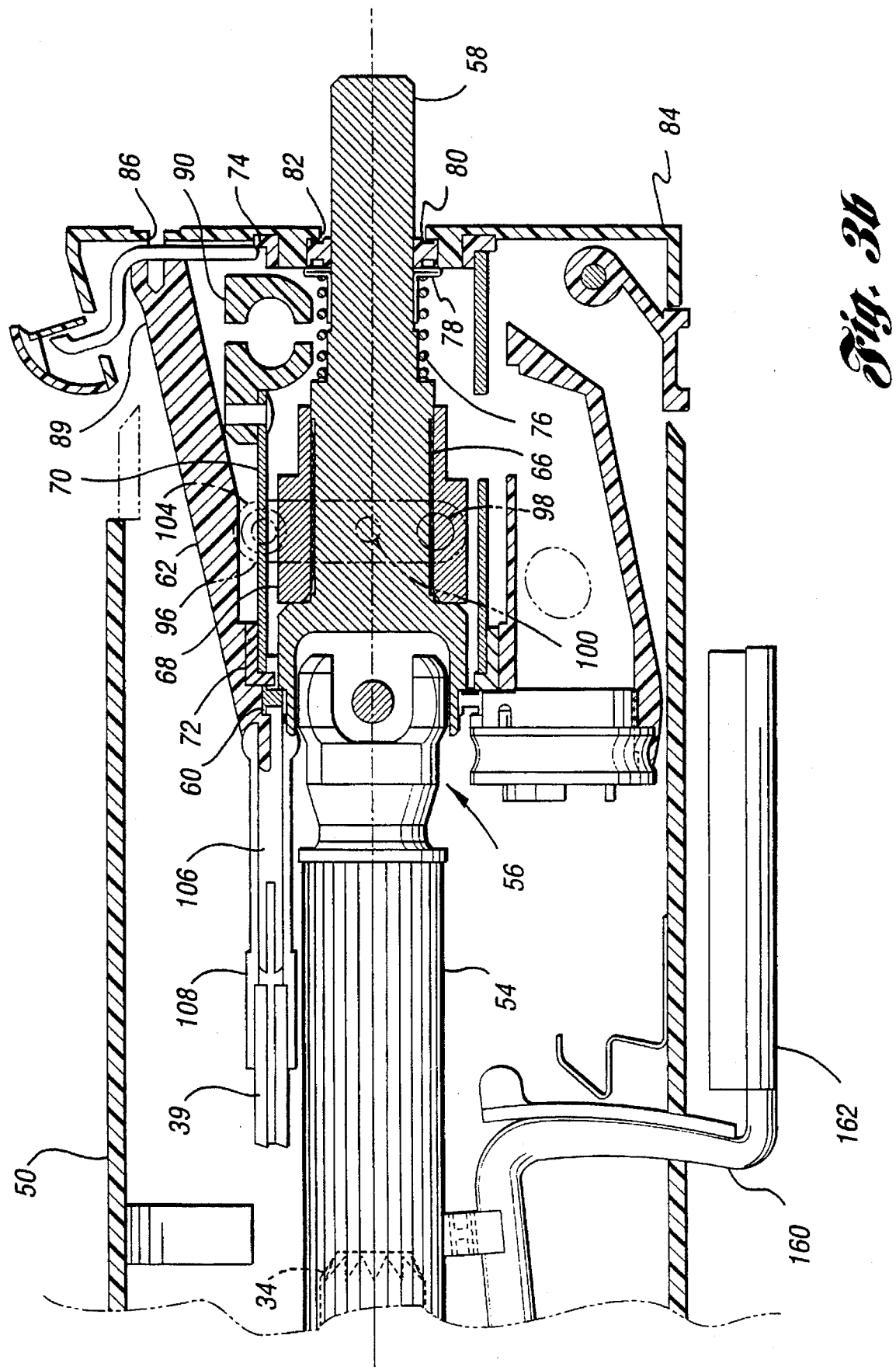
FIG. 3b shows a cutaway side view of the upper portion of a steering column assembly in accordance with the present invention.

FIG. 1 shows a modular main housing assembly 10 installed in a vehicle 12 in accordance with the present invention. The modular main housing assembly 10 supports a steering wheel 14, and is slidably supported by the receiver 20. The receiver 20 is rigidly supported in the vehicle by a cross-car beam 16.

The receiver 20 acts as a locator for the modular main housing assembly 10, and it guides the assembly as the steering column is being telescoped. The receiver 20 also guides the main housing assembly 10 in a high-energy impact. The receiver 20 reacts peak loads in daily use, and also supports all loads applied to the steering wheel 14 in a high-energy impact. It also provides means for optimally cushioning ride-down and energy dissipation in a high-energy impact.

FIGS. 2a and 2b show exploded perspective views of portions of the steering column assembly 22. The modular steering column assembly 22 includes the receiver 20 which is mounted on a cross car beam in a vehicle. A lower bearing retainer 24 is secured to the sidewalls 26 of the receiver 20 at the mounting holes 27 by rivets 57. The lower bearing retainer 24 has a central aperture 28 formed therethrough for receiving the lower bearing 30. The lower bearing 30 rotatably supports the lower universal joint 32 at journal 31. A splined lower steering column shaft 34 and an intermediate shaft 36 are connected to the lower universal joint 32.

Prior to installation of the modular main housing assembly 10, the receiver 20, lower bearing retainer 24, lower bearing 30, lower electrical connector 38, lower transmission cable 39, and lower steering column shaft 34 are in position to receive the modular main housing assembly 10. The lower steering column shaft 34, lower transmission cable 39, and the lower electrical connector 38 are supported by a reusable installation tool 40. The lower electrical connector 38 is matable with the upper electrical connector 42.

The modular main housing assembly 10 includes a telescope housing 50 telescopically received within the receiver 20, as shown in FIG. 3a. For installation, the upper steering column support 52 temporarily supports the upper steering column shaft 54, which is positioned within the telescope housing 50 and is laterally splined to receive in sliding engagement the externally splined lower steering column shaft 34. The upper steering column shaft 54 is connected to an upper universal joint 56, which includes a tilt shaft 58 connected thereto at the opposite end. The upper universal joint 56 is supported by the upper bearing 60 in the tilt head 62. The tilt head 62 is pivotally connected to the telescope housing 50 at the pivot joint 64.

A retainer ring 66 rigidly secures the lock collar 68 to the tilt shaft 58 above the upper universal joint 56. The shift socket 70 is disposed concentrically about the tilt shaft 58, and is rotatably supported by the bearings 72, 74. This arrangement is more clearly shown in FIG. 3b. The spring 76 biases the support cap 78 against the bearing 80. The bearing 80 rotatably supports the upper portion of the tilt shaft 58 within the aperture 82 formed in the tilt plate 84. The tilt plate 84 is secured to the tilt head 62 by screws extending through the apertures 86 in the tilt plate 84 and into the upper ends 89, 90 of the tilt head 62.

The gear shift lever 88 is secured to the shift socket 70 by the jaws 90. The gear shift lever 88 is secured in desired PRNDL positions by the detent arrangement 92 in the tilt plate 84. The position of the lever 88 is displayed on the PRNDL member 94.

Referring to FIGS. 2b and 3b, movement of the gear shift lever 88 causes rotation of the shift socket 70 about the tilt shaft 58. A selector arm 96 is pivotally mounted to the tilt head 62 at the pivot joint 98. The selector arm 96 includes a guide pin 100, which engages the helical slot 102 formed in the shift socket 70 (see FIG. 2b). The distal end 104 of the selector arm 96 is connected to the upper transmission cable 106. The upper transmission cable 106 includes a mating plug 108 for mating with the lower transmission cable 39, which leads to the transmission. The lower transmission cable 39 is guided into and mated with the transmission mating plug 108 when the modular main housing assembly 10 is inserted into the receiver 20.

Rotation of the shift socket 70 by the gear shift lever 88 causes the guide pin 100 to travel along the helical slot 102 formed in the shift socket 70. The selector arm 96 then pivots about the pivot joint 98 as the guide pin 100 travels in the helical slot 102. Accordingly, the distal end 104 of the selector arm 96 is moved axially along the tilt shaft 58. The distal end 104 of the selector arm 96 is connected to the transmission cable 106, so that rotation of the shift socket 70 translates into linear movement of the transmission cable 106 along the tilt shaft 58 and along the upper steering column shaft 54. In this manner, transmission gears are selected by movement of the shift lever 88, which translates into linear movement of the transmission cable 106.

Referring to FIG. 2b, a multi-function switch assembly 134 and blinker lever 136 are connected to the telescope housing 50. The multi-function switch assembly 134 includes a switch (not shown) which extends through the side opening 51 in the telescope housing 50 (shown in FIG. 2a). The switch further extends through the slot 71 in the shift socket 70 for engagement with the slots 133 formed in the lock collar 68. When the steering column is rotated in a direction opposite that of the blinker indicator, the switch engages with one of the slots 134 in order to cancel the blinker.

The tilt head 62 is pivotally mounted with respect to the telescope housing 50 for user adjustment of steering wheel height. The tilt head 62 may be secured in a desired angular position with respect to the telescope housing 50 by a bracket and paw assembly, shown in FIG. 2b. The tilt bracket 138 is secured to the telescope housing 50 at the apertures 140, 142 formed in the telescope housing 50 (shown in FIG. 2a). The tilt bracket 138 includes a plurality of teeth 140 formed thereon for engagement with teeth 142 extending from the tilt lever 144. The tilt lever 144 is pivotally connected to the tilt plate 84 at the lever mounting holes 89 on the rear of the tilt plate 84. A thumb button 146 extends from the tilt lever 144 into a slot 91 formed in the bottom of the tilt plate 84. The driver may depress the thumb button 146 to pivot the tilt lever 144 about the joint 148 to disengage the tilt lever teeth 142 from the tilt bracket teeth 140. In this manner, the driver may adjust the tilt head 62 to a desired steering wheel position, and release the thumb button 146 to reengage the tilt bracket 138 and tilt lever 144.

As shown in FIG. 2b, a pair of support shrouds 150, 152 are connected to the telescope housing 50 at the shroud holes 154. Hollow bosses 156 extend from the rear of the support shrouds 150, 152 into communication with the shroud holes 154. A plurality of screws secure the support shrouds 150, 152 to the telescope housing 50 through the hollow bosses 156 and shroud holes 154. The shrouds 150, 152 provide contour for styling purposes. The shrouds could, of course, be eliminated.

Referring to FIGS. 3a and 3b, telescoping movement of the telescope housing 50 with respect to the receiver 20 is controlled by the lever 160. The lever 160 includes a handle 162 which extends below the telescope housing 50 for driver manipulation. The handle 160 is pivotally mounted to the telescope housing 50 at the pivot joint 164 through the bracket 166. The lever 160 is also pivotally mounted to a lock member 168 at pivot joint 170. The lock member 168 includes a plurality of teeth 172, which are engageable with the teeth of a rack 174. The rack 174 is connected to the receiver 20 by means of the energy absorption ribbon 176 and pegs 178 (FIG. 2a). The adjustable telescoping travel of the telescope housing 50 is limited by the length of the rack 174. When the lock 168 reaches the end of the rack, no further movement can occur in that direction. Alternatively, other linkages are available to accomplish this action.

Figure 4:
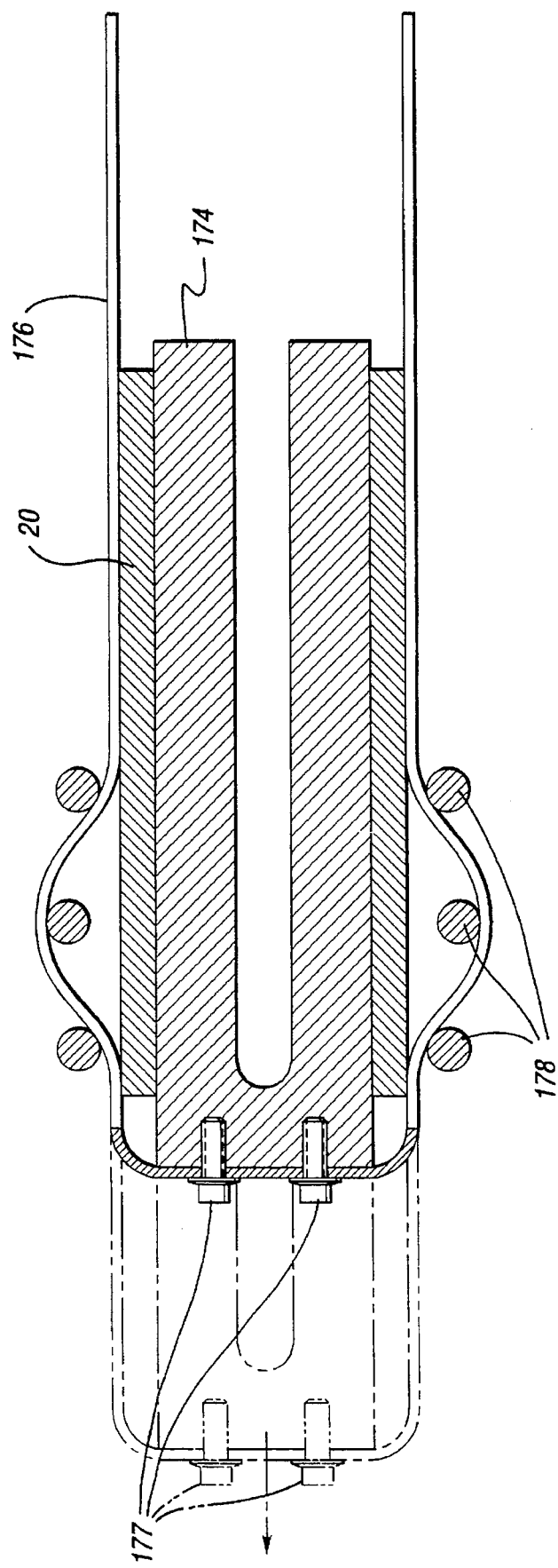
FIG. 4 shows a sectional view of a rack and energy absorption ribbon in accordance with the present invention.

FIG. 4 shows the attachment screws 177 which secure the ribbon 176 to the rack 174. The ribbon 176 is press-fit into the pegs 178, which secure the ribbon 176 to the receiver 20. The configuration of the pivot joints 164, 170 (FIG. 3a) will cause the teeth of the lock member 168 and the teeth of the rack 174 to wedge more firmly together when force is exerted axially on the column. In a high-energy impact, the jaws will remain locked, and the telescope housing and rack will force the ribbon 176 through the pegs 178 to dissipate the impact energy.

Figure 5:
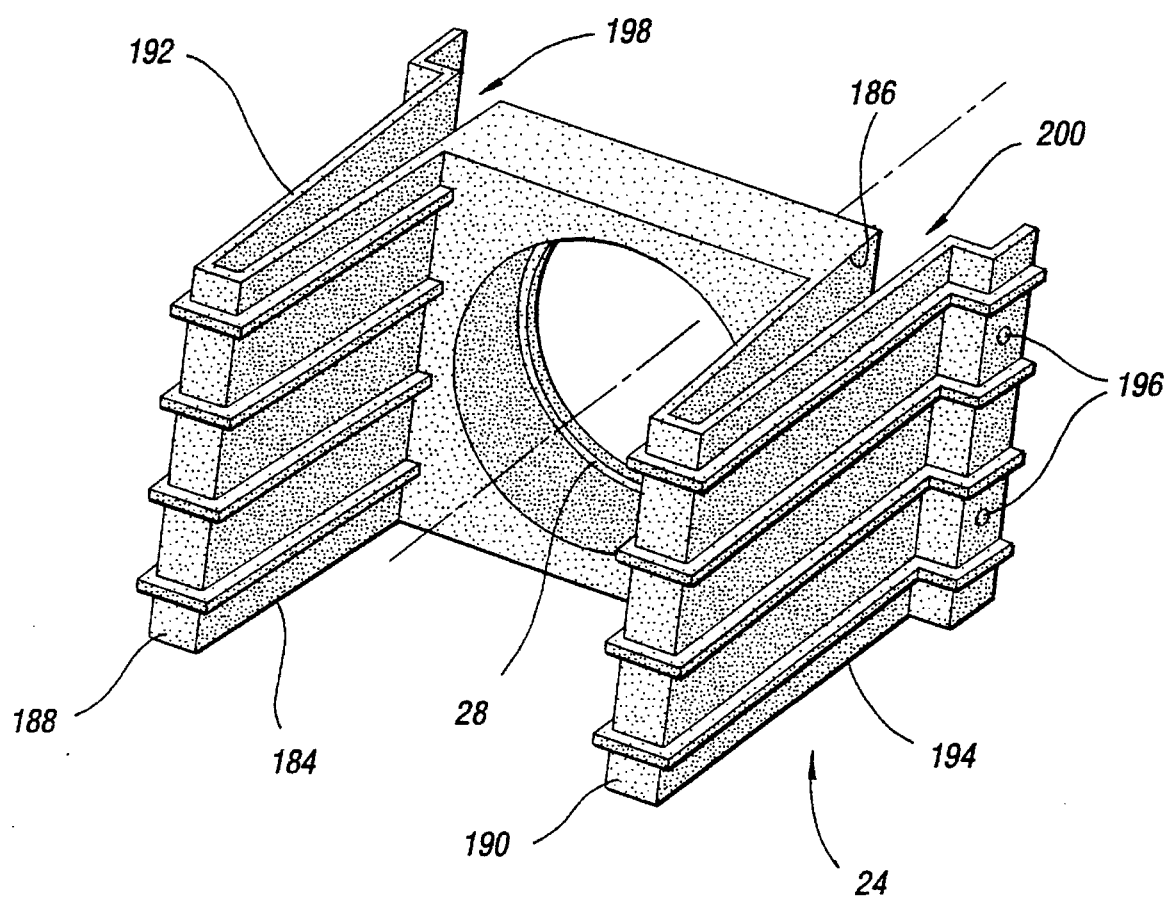
FIG. 5 shows a perspective view of a lower bearing retainer in accordance with the present invention.

FIG. 5 shows a perspective view of the lower bearing retainer 24. The lower bearing retainer comprises a substantially U-shaped portion including a pair of legs 184, 186 with laterally extending peripheral ends 188, 190. A central aperture 28 is formed through the center of the lower bearing retainer for receiving the lower bearing 30. A pair of lateral flanges 192, 194 extend from the peripheral ends 188, 190, and are attached to the receiver at the holes 196 formed in the lateral flanges.

The legs 184, 186 and lateral flanges 192, 194 of the lower bearing retainer cooperate respectively to form a pair of spaced apart slots 198, 200 for receiving the sidewalls 47, 49 of the telescope housing 50 (as shown in FIG. 2a). Still referring to FIG. 2a, the sidewalls 47, 49 of the telescope housing 50 each form a respective slot 53, 55 for receiving the peripheral ends 188, 190 therethrough. Referring to FIGS. 6 and 7, when the trailing edge 59 of the slots 53, 55 bottom out against the peripheral ends 188, 190, as demonstrated in FIG. 6, the telescope housing 50 has reached its maximum internal collapsing capability as permitted by the lower bearing retainer. If additional energy is to be absorbed then upon application of a predetermined additional axial force applied to the telescope housing 50, the rivets 57 shear, and the lower bearing retainer 24 is disconnected from the receiver 20, as demonstrated in FIG. 7. This movement allows the intermediate shaft 36 to begin collapsing, which allows the telescope housing 50 to move further in the direction of the engine compartment. This movement beyond the travel normally allowed by the lower bearing retainer is referred to as "external collapse".

While the best modes for carrying out the invention have been described in detail, those familiar with the art to which this invention relates will recognize various alternative designs and embodiments for practicing the invention. Thus the above described preferred embodiment is intended to be illustrative of the invention which may be modified within the scope of the following appended claims.

What is claimed is:

1. A collapsible steering column assembly for a vehicle, comprising:

a main housing rigidly supported in the vehicle;

a lower bearing retainer connected to said main housing;

a lower steering column assembly rotatably supported with respect to said lower bearing retainer, normally axially fixed with respect to said lower bearing retainer, and including a collapsible intermediate shaft, said intermediate shaft being collapsible when said bearing retainer is not connected to said main housing; and a telescope housing telescopically moveable with respect to said main housing, and sufficiently engageable with said bearing retainer to disconnect said bearing retainer from said main housing when sufficient load is exerted on said telescope housing, whereby to allow collapse of said intermediate shaft.

2. The collapsible steering column assembly of claim 1, wherein said bearing retainer comprises:

a substantially U-shaped portion including a pair of legs with laterally extending peripheral ends and a central portion with an aperture formed therethrough for receiving said steering column assembly;

a pair of lateral flanges extending from said peripheral ends; and a plurality of shearable rivets connected to said lateral flanges for removably securing said flanges to said main housing;

whereby movement of said telescope housing against said peripheral ends of said lower bearing retainer shears said shearable rivets to allow collapse of said intermediate shaft when sufficient load is exerted on said telescope housing.

3. The collapsible steering column assembly of claim 2, wherein said pair of legs and said pair of lateral flanges cooperate respectively to form a pair of spaced apart slots for receiving said pair of side walls of said telescope housing.

4. The collapsible steering column assembly of claim 3, wherein said pair of side walls each form a respective slot therein for receiving said peripheral ends of said substantially U-shaped portion therethrough to allow further collapsing telescope movement of said telescope housing with respect to said main housing.

5. A collapsible steering column assembly, comprising:

a receiver for supporting the steering column assembly in a vehicle;

a telescope housing slidably mounted with respect to said receiver, said telescope housing having a pair of side walls;

an upper steering column assembly, including an upper universal joint coupled with respect to said telescope housing;

a lower bearing retainer removably secured with respect to said receiver;

a lower bearing supported within said lower bearing retainer;

a lower steering column assembly, including a lower universal joint rotatably supported by said lower bearing, and said lower steering column assembly being telescopically mateable with said upper steering column assembly; and said telescope housing being engageable with said lower bearing retainer whereby to disengage said lower bearing retainer from said receiver to allow collapse of said lower steering column assembly when sufficient axial load is exerted on said telescope housing.

6. The collapsible steering column assembly of claim 5, wherein said lower bearing retainer comprises:

a substantially U-shaped portion including a pair of legs with laterally extending peripheral ends and a central portion with an aperture formed therethrough for receiving said lower bearing;

a pair of lateral flanges extending from said peripheral ends; and a plurality of shearable rivets connected to said lateral flanges for removably securing said flanges to said receiver;

whereby movement of said telescope housing against said peripheral ends of said lower bearing retainer shears said shearable rivets to allow collapse of said lower steering column assembly when sufficient load is exerted on said telescope housing.

7. The collapsible steering column assembly of claim 6, wherein said pair of legs and said pair of lateral flanges cooperate respectively to form a pair of spaced apart slots for receiving said pair of side walls of said telescope housing.

8. The collapsible steering column assembly of claim 6, wherein said pair of side walls each form a slot therein for receiving said peripheral ends of said substantially U-shaped portion therethrough to allow further collapsing telescope movement of said telescope housing with respect to said receiver.

9. A collapsible steering column assembly, comprising:

a receiver for supporting the steering column assembly in a vehicle;

a lower bearing retainer removably secured to said receiver;

a lower bearing supported within said lower bearing retainer;

a collapsible lower steering column assembly including, a lower universal joint supported within said lower bearing;

a telescope housing telescopically slidable within said receiver;

an upper steering column assembly rotatably supported and axially oriented with respect to said telescope housing, and telescopically mateable with said lower steering column assembly; and said telescope housing being engageable with said lower bearing retainer, whereby to push said lower bearing retainer to disengage said lower bearing retainer from said receiver to allow collapse of said lower steering column assembly when sufficient axial load is exerted on said telescope housing.

10. The collapsible steering column assembly of claim 9, wherein said lower bearing retainer comprises:

a substantially U-shaped portion including a pair of legs with laterally extending peripheral ends and a central portion with an aperture formed therethrough for receiving said lower bearing;

a pair of lateral flanges extending from said peripheral ends; and a plurality of shearable rivets connected to said lateral flanges for securing said flanges to said receiver;

whereby movement of said telescope housing against said peripheral ends of said lower bearing retainer shears said shearable rivets to allow collapse of said lower steering column assembly when sufficient load is exerted on said telescope housing.

11. The collapsible steering column assembly of claim 10, wherein said pair of legs and said pair of lateral flanges cooperate to form a pair of spaced apart slots for receiving said pair of side walls of said telescope housing.

12. The collapsible steering column assembly of claim 11, wherein said pair of side walls each form a slot therein for receiving said peripheral ends of said substantially U-shaped portion therethrough to allow further collapsing telescope movement of said telescope housing with respect to said receiver.

* * * * *